(12) United States Patent
Kramer (10) Patent No.: US 11,885,487 B2
(45) Date of Patent: Jan. 30, 2024

(54) HOT EVAPORATOR REFILLING

(71) Applicant: NEM ENERGY B.V., Amsterdam (NL)

(72) Inventor: Walter Adriaan Kramer, Rotterdam (NL)

(73) Assignee: NEM ENERGY B.V., Zoeterwoude (NL)

( * ) Notice: Subject to any disclaimer, the term of this patent is extended or adjusted under 35 U.S.C. 154(b) by 0 days.

(21) Appl. No.: 17/781,019

(22) PCT Filed: Oct. 8, 2020

(86) PCT No.: PCT/EP2020/078285
§ 371 (c)(1),
(2) Date: May 30, 2022

(87) PCT Pub. No.: WO2021/115663
PCT Pub. Date: Jun. 17, 2021

(65) Prior Publication Data
US 2022/0412548 A1  Dec. 29, 2022

(30) Foreign Application Priority Data
Dec. 11, 2019 (EP) ................................ 19215308

(51) Int. Cl.
*F22B 1/18* (2006.01)
*F22D 1/00* (2006.01)

(52) U.S. Cl.
CPC ............ *F22B 1/1815* (2013.01); *F22D 1/003* (2013.01)

(58) Field of Classification Search
CPC ................................ F22B 1/1815; F22B 1/18
See application file for complete search history.

(56) References Cited

U.S. PATENT DOCUMENTS 4,262,636 A * 4/1981 Augsburger ............ F22B 35/14
122/1 B
4,799,461 A * 1/1989 Shigenaka ............ F01K 23/108
122/420

(Continued)

FOREIGN PATENT DOCUMENTS

EP  0357590 A1  3/1990
EP  3224541 B1  3/2019

OTHER PUBLICATIONS

PCT International Search Report and Written Opinion of International Searching Authority dated Jan. 14, 2021 corresponding to PCT International Application No. PCT/EP2020/078285 filed Oct. 8, 2020.

*Primary Examiner* — Gregory A Wilson
(74) *Attorney, Agent, or Firm* — Grossman, Tucker, Perreault & Pfleger, PLLC (57) ABSTRACT

A heat recovery steam generator includes an exhaust-gas channel with an economizer heating surface and evaporator heating surface. The heating surfaces are connected to one another such that, on a feed water side, the economizer heating surface is upstream of the evaporator heating surface. A water/steam separator is arranged on the feed water side downstream of the evaporator heating surface. An excess pipe length system is outside the exhaust-gas channel and is designed in such a way that, after a complete filling of the economizer heating surface, feed water, in a riser of the excess pipe length system, reaches an overflow and thus passes into the evaporator heating surface via a down pipe. A vent line branches off the overflow of the excess pipe length system. A first filling line and a first valve are arranged between an economizer filling outlet and the evaporator outlet of the evaporator heating surface.

8 Claims, 4 Drawing Sheets

(56) References Cited

U.S. PATENT DOCUMENTS

| | | | | |
|---|---|---|---|---|
| 5,588,400 | A * | 12/1996 | Stefan | F22B 1/1815 122/33 |
| 5,762,031 | A * | 6/1998 | Gurevich | F22B 29/04 122/1 C |
| 6,173,679 | B1 * | 1/2001 | Bruckner | F22B 1/1815 122/451 S |
| 6,311,647 | B1 * | 11/2001 | Liebig | F22G 5/12 122/487 |
| 8,297,236 | B2 * | 10/2012 | Franke | F22B 29/06 122/406.1 |
| 2001/0025609 | A1 * | 10/2001 | Liebig | F22D 1/12 122/406.1 |
| 2018/0266673 | A1 * | 9/2018 | Zubrod | F22B 1/1815 |

* cited by examiner

FIG 4

HOT EVAPORATOR REFILLING

CROSS REFERENCE TO RELATED APPLICATIONS

This application is the US National Stage of International Application No. PCT/EP2020/078285 filed 8 Oct. 2020, and claims the benefit thereof. The International Application claims the benefit of European Application No. EP19215308 filed 11 Dec. 2019. All of the applications are incorporated by reference herein in their entirety.

FIELD OF THE INVENTION

The invention relates to a vertical heat recovery steam generator with once through evaporator.

BACKGROUND OF THE INVENTION

In a heat recovery steam generator, the energy contained in the hot gas stream exiting a hot gas source (e.g. gas turbine) is converted into steam.

In the heat recovery steam generator there are arranged, in an exhaust-gas channel, several heating surfaces for pre-heating feed water, for generating steam and for subsequently superheating steam. The heating surfaces are typically flowed through by a flow medium from the feed water/steam circuit of a combined cycle or cogeneration plant. Here, heat is transferred from the exhaust gas to the flow medium and can thus be used for the further energy conversion in the steam turbine such that the overall result is a relatively high degree of efficiency for the combined cycle or cogeneration plant.

For a heat recovery steam generator, several alternative design concepts come into consideration, namely the design as a once-through steam generator or the design as a circulation steam generator. In a once-through steam generator, the heating of evaporator tubes of the evaporator heating surfaces leads to evaporation of the flow medium in a single pass. In order to safely rule out the possibility of non-evaporated flow medium passing from the evaporator pipes into the downstream superheater heating surfaces, a water separator is typically provided between the evaporator heating surfaces and the downstream superheater heating surfaces. In said water separator, separated water is then fed to an expansion device. The steam formed during the expansion in the atmospheric expansion device is typically discharged to the surroundings.

Prior to start-up of the vertical heat recovery steam generator with once through evaporator, the once-through evaporator heating surface must be (partially) filled with feed water.

Filling the once-through evaporator heating surface of a vertical heat recovery steam generator with liquid from the top under warm/hot condition (medium in evaporator at saturation temperature, typically at an absolute pressure >=2 bar), while this evaporator is (partially) filled with a two phase mixture of liquid and vapor, results in instability and errors in level measurement. This makes it virtually impossible to get a reliable indication of the amount of water in the evaporator. Having an indication of the water content of the evaporator is a prerequisite for starting the installation.

Filling can best be achieved by bringing in the liquid from the bottom of the evaporator, however, filling from the bottom with cold water (subcooled water at a temperature more than 30K below the saturation temperature corresponding to local pressure, as done during initial filling) is not feasible for preparation of start-up under warm/hot conditions, because of the large temperature difference between entering liquid and evaporator tube and header walls. The large temperature difference could result in damaging the tubes and/or headers.

A prior art arrangement of a vertical heat recovery steam generator with once through evaporator is known form patent EP 3 224 541 B1. An object of EP 3 224 541 B1 is to provide a heat recovery steam generator which overcomes the disadvantages of water and energy loss associated with water ejection during the start-up. To limit the amount of water ejected during start-up, EP 3 224 541 B1 introduces an excess pipe length system located outside the exhaust-gas channel and between the at least one economizer heating surface and the at least one evaporator heating surface on the feed water side. This excess length pipe system is designed in such a way that, after the complete filling of the at least one economizer heating surface, feed water, in a riser of the excess pipe length system, reaches an overflow and thus passes into the at least one evaporator heating surface via a down pipe.

In this way it is possible for the water level in the at least one evaporator heating surface to be set as desired, despite the completely filled economizer heating surface(s). Overall, the arrangement according to the EP 3 224 541 B1 thus leads to a reduction in the water loss during the start-up of the waste-heat steam generator and therefore to relatively low energy losses.

EP 3 224 541 B1 thus addresses (partial) filling of the once-through evaporator heating surface, however the complications of filling under warm/hot conditions are not specifically addressed. In fact, EP 3 224 541 B1 describes filling of an evaporator heating surface from the top. Filling from the top under warm/hot conditions however results in an instable liquid level in the evaporator heating surface.

Prior to start-up of a heat recovery steam generator under warm/hot conditions, the evaporator heating surface will be (partially) filled with a non-homogeneous water/steam mixture. To prepare for start-up, the evaporator heating surface needs to be (partially) filled up with feed water. When trying to fill up the evaporator heating surface with feed water from the top, the water/steam mixture will not be displaced in such a way that the feed water flows to the bottom of the evaporator and the steam is expelled to the top. In fact, trying to fill from the top under warm/hot conditions results in rather chaotic mixing and condensation. Hence a pressure-measurement device cannot reliably measure the level of feed water in the evaporator heating surface. A reliable indication of the water content of the evaporator heating surface is however a prerequisite for starting the installation. Filling from the top under warm/hot conditions makes it impossible to partially fill up the evaporator heating surface to such an extent that an optimization between minimum water ejection and optimized start-up time can be achieved.

It is therefore a goal of the present invention to provide a heat recovery steam generator which overcomes the above-mentioned disadvantage. A heat recovery steam generator shall be provided, in which it is possible to partially fill up an evaporator heating surface such that water ejection and start-up time of the heat recovery steam generator are minimized. A further goal of the invention is to provide a method for refilling the evaporator heating surface of such a heat recovery steam generator.

SUMMARY OF THE INVENTION

The object of the invention is achieved by the independent claims. The dependent claims describe advantageous developments and modifications of the invention.

In accordance with the invention there is provided a heat recovery steam generator with the characteristics of the independent claim. A heat recovery steam generator of vertical design and according to the invention comprises an exhaust-gas channel in which at least one economizer heating surface with economizer inlet and economizer outlet and at least one evaporator heating surface with evaporator inlet and evaporator outlet are arranged, wherein the at least one economizer heating surface and the at least one evaporator heating surface are connected to one another in such a way that, on a feed water side, the at least one economizer heating surface is arranged upstream of the at least one evaporator heating surface, such that the economizer outlet is in fluid connection with the evaporator inlet, wherein a water/steam separator is arranged on the feed water side downstream of the at least one evaporator heating surface, wherein an excess pipe length system is arranged outside the exhaust-gas channel and on the feed water side between the at least one economizer heating surface and the at least one evaporator heating surface, wherein the excess pipe length system is designed in such a way that, after a complete filling of the at least one economizer heating surface, feed water, in a riser of the excess pipe length system, reaches an overflow and thus passes into the at least one evaporator heating surface via a down pipe, wherein a vent line with a first vent valve branches off the overflow of the excess pipe length system, and a first filling line and a first valve are arranged between an economizer filling outlet, arranged downstream of the economizer inlet of the at least one economizer heating surface, and the evaporator outlet of the at least one evaporator heating surface.

On the inlet side, the economizer has an inlet distributor common to all economizer heat transfer tubes of an economizer heating surface, into which a feedwater line is connected.

On the outlet side, the heat transfer tubes of a first economizer heating surface open out into a common outlet collector, which is either at the same time also the inlet distributor of another heating surface arranged downstream of the first economizer heating surface on the medium side, or which is connected to such an inlet distributor. In any case, branch-off from the heat transfer tubes is not feasible, and therefore the arrangement of the economizer filling outlet downstream of the economizer inlet means that removal of preheated feedwater to refill the evaporator can only take place after the feed water has passed through at least one economizer heating surface.

In other words, prior to start-up of a vertical once-though heat recovery steam generator, the evaporator heating surface needs to be (partially) filled up with liquid. The present invention provides a solution for this task and the above-mentioned drawback of prior art, enabling filling of evaporator heating surface under warm/hot start-up conditions with warm/hot feed water, i.e. water at a temperature close to the saturation temperature corresponding to the local pressure. The essential idea of the present invention is to fill the evaporator heating surface from the bottom, i.e. from its exit, against a steam flow direction during operation, with warm/hot feed water. An important advantage of the heat recovery steam generator according to the present invention is that filling the evaporator heating surface from the bottom with warm/hot water results in a stable feed water level which can be reliably measured by pressure-measurement devices.

In an advantageous embodiment of the invention the first valve and at least part of the first filling line are arranged outside the exhaust-gas channel. Particularly with regard to the presence and operation of a valve, the arrangement outside the hot gas path is advantageous because it is easier to implement it there and not in a hot gas environment. An arrangement in the hot gas path would be technically much more complex and more expensive.

It is advantageous, when the first filling line branches off from, on a feed water side, a second last economizer heating surface. As an advantageous alternative the first filling line branches off from, on a feed water side, a last economizer heating surface. This includes corresponding downstream collectors or upstream distributors of the economizer heating surfaces.

In an advantageous embodiment of the invention, the vent line is arranged between the overflow of the excess pipe length system and the water/steam separator.

It is advantageous, when the first filling line leads to the evaporator outlet of a last evaporator heating surface and the first valve is arranged in the first filling line.

It is still advantageous, when a connecting line interconnects the evaporator outlet of the last evaporator heating surface and the water/steam separator, and the first filling line leads to the connecting line and the first valve is arranged in the first filling line.

It is still advantageous, when a second filling line is connected to the connecting line and a second valve is arranged in the second filling line. This enables cold filling from the bottom of the at least one economizer heating surface under cold conditions (i.e. subcooled water in the evaporator at a temperature more than 30K below the saturation temperature, typically at an absolute pressure <=2 bar) through the second valve if the first valve is closed.

As an advantageous alternative, wherein the first filling line is connected to the second filling line at a connection point downstream of the second valve, the first valve is arranged downstream of the connection point in the second filling line. This enables cold filling from the bottom of the at least one evaporator heating surface under cold conditions through the second valve if the first valve is open.

The method for refilling an evaporator heating surface of a heat recovery steam generator according to the present invention, comprises the step of supplying water from the at least one economizer heating surface to the evaporator heating surface from the evaporator outlet.

The advantages of this method largely correspond to the above-mentioned advantages of the heat recovery steam generator. In particular, the water supply from an economizer heating surface to the evaporator via its outlet allows for a hot/warm refill of the evaporator and consequently also for reliable level measurements.

BRIEF DESCRIPTION OF THE DRAWINGS

Embodiments of the invention are now described, by way of example only, with reference to the accompanying drawings, of which.

The illustration in the drawings is in schematic form. It is noted that in different figures, similar or identical elements may be provided with the same reference signs.

DETAILED DESCRIPTION OF THE INVENTION

Figure 1:
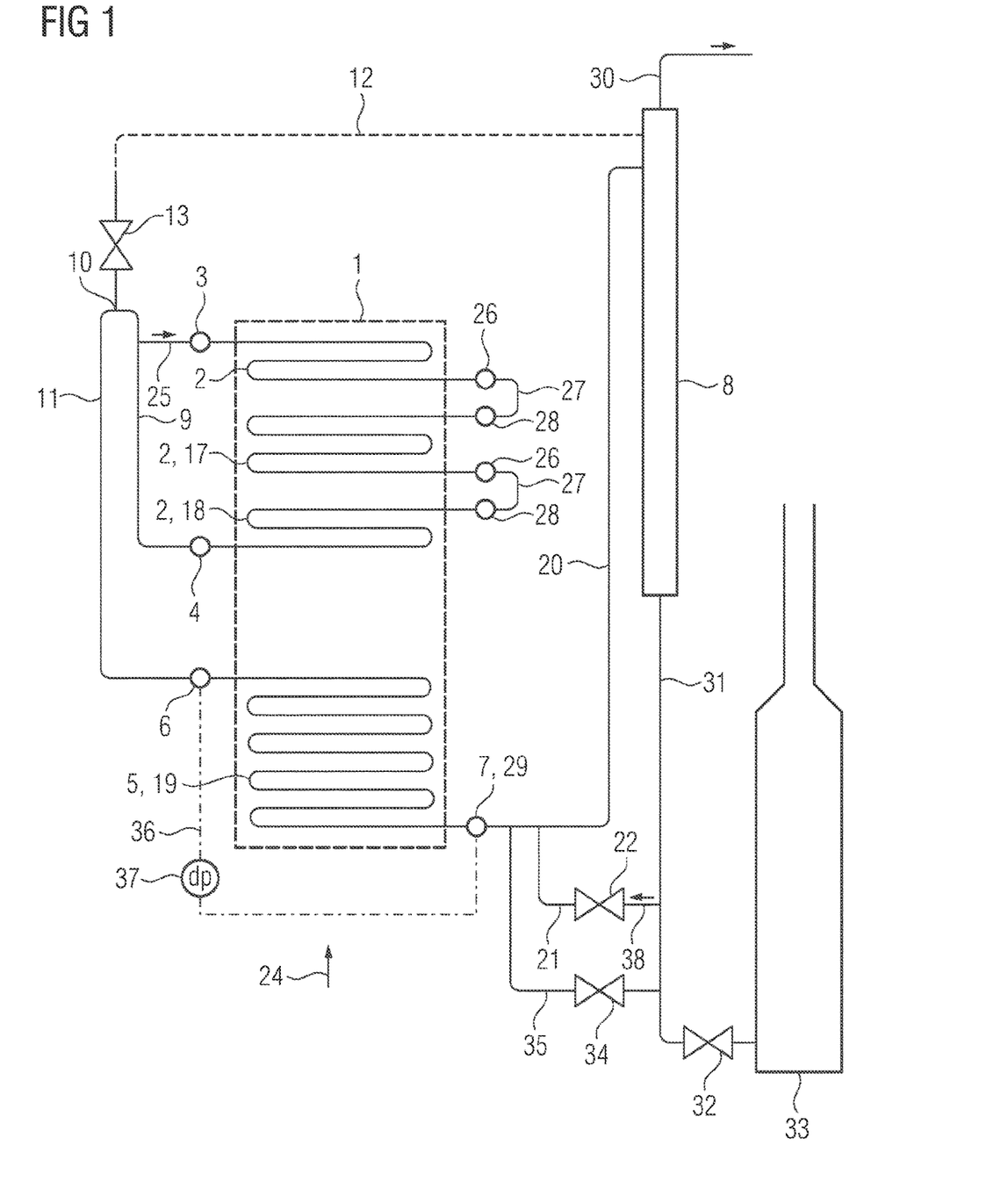
FIG. 1 shows a known arrangement of a heat recovery steam generator of vertical design.

FIG. 1 shows, in a highly diagrammatic manner, the basic structure of heat recovery steam generators of vertical design which are currently known. Exhaust gas 24 from a gas turbine or other heat source (not shown in more detail) flows through the exhaust-gas channel 1 of the heat recovery steam generator from bottom to top. Inside the exhaust-gas channel 1, there are arranged in the vertical direction several heating surfaces 2 and 5 which are flowed through by a fluid 25 from the feed water/steam circuit of a combined cycle or cogeneration plant. Here, heat is transferred from the exhaust gas 24 to the fluid 25 and can thus be used for the further energy conversion in a steam turbine such that the overall result is a relatively high degree of efficiency for a combined cycle or cogeneration plant.

The various heating surfaces 2, 5 are arranged in the exhaust-gas channel 1 in such a manner that, on the exhaust-gas side, economizer heating surfaces 2 with economizer inlet 3 and economizer outlet 4 are arranged downstream of the at least one evaporator heating surface 5 with evaporator inlet 6 and evaporator outlet 7 and further superheater heating surfaces (not shown). Arrangements which are currently known, however, may have a significantly more complex structure with partially intertwined heating-surface arrangements. On the side of the fluid 25, the economizer heating surfaces 2 are, in contrast, arranged upstream of the evaporator heating surface 5, such that cool feed water 25 flowing into the economizer heating surfaces 2 is heated moderately in the relatively cold part of the exhaust-gas channel 1, and only afterwards is evaporated in the relatively hot part of the exhaust-gas channel 1, in the evaporator heating surface 5 arranged therein.

Each of the heating surfaces 2 and 5 consists of a multiplicity of tubes which are arranged next to one another and which are connected to one another via respective—diagrammatically depicted—distributors 28 at the inputs and collectors 26 at the outputs of the heating surfaces 2 and 5 such that an equalization of the through-flowing fluid through the respective tube assembly of a heating surface 2, 5 occurs. In the arrangement shown in FIG. 1, there are arranged, in the exhaust-gas channel 1, three economizer heating surfaces 2 which are connected to one another via corresponding collectors 26, second connecting lines 27 and distributors 28. The fluid exiting a last economizer heating surface 2, 18 is then guided into the evaporator heating surface 5 via an excess pipe length system consisting of a riser 9, an overflow 10 and a down pipe 11. This excess pipe length system is arranged outside the exhaust-gas channel 1 and between the last economizer heating surface 18 and the evaporator heating surface 5 on the fluid side. Fluid can here be introduced into the downstream evaporator heating surface 5 in a regulated manner without further pressurization in the economizer heating surfaces 2. Prior to the start-up of vertical once-though heat recovery steam generator, the evaporator heating surface 5 can thus be (partially) filled to such an extent that an optimization between minimum water ejection and optimized start-up time can be achieved.

At the evaporator outlet 7 of the single evaporator heating surface 5 shown here, there is a link to a water/steam separator 8 via a further collector 29 and a first connecting line 20. Non-evaporated flow medium ejected from the evaporator heating surface 5 during the start-up of the heat recovery steam generator is thus introduced, together with evaporated fluid, into the water/steam separator 8, where it is separated. The evaporated fluid can be fed, via a steam line 30, for example to a further superheater heating surface, while the non-evaporated fluid can be fed, via a first drain line 31 with a first drain valve 32 and an atmospheric expansion device 33, to the feed water/steam circuit.

Additional measures, such as a second drain valve 34 arranged in a second drain line 35, which connects the first connecting line 20 with first drain line 31 for dewatering the evaporator heating surface 5 and/or a vent line 12 with a first vent valve 13, allow the fluid level of the fluid in the evaporator heating surface 5 to be adjusted, independently of the system pressure, prior to each starting state. In order to measure the fluid level in the evaporator heating surface 5 for the regulation, a suitable level measurement means is additionally installed. For this purpose, parallel to the at least one evaporator heating surface 5, there are provided a measurement line 36 and a pressure-measurement device 37 for measuring the level of the fluid in the at least one evaporator heating surface 5. As a result of the vent line 12 being connected to the steam line 30 for discharging steam from the water/steam separator 8, and not directly to the atmosphere, venting of the excess pipe length system can take place without any appreciable pressure drop in the evaporator heating surface 5. As a result of the second drain valve 34 being integrated upstream of the first drain valve 32, the second drain valve 34 can be designed as a simple "Open/Close" valve, while the actual regulation of the dewatering of the evaporator heating surface 5 takes place by way of the first drain valve 32.

For initial filling of evaporator heating surface 5 under cold conditions, i.e. subcooled water in the evaporator at a temperature more than 30K below the saturation temperature, typically at an absolute pressure <=2 bar, cold water 38 can be admitted through second filling line 21 and second valve 22 to (partially) fill up evaporator heating surface 5 from the bottom to top. Filling from bottom to top has the advantage of effectively displacing air from evaporator heating surface 5 by the entering cold feed water 38. Air escapes through down-flow conduit 11 via first vent valve 13 and vent line 12 to water/steam separator 8.

Figure 2:
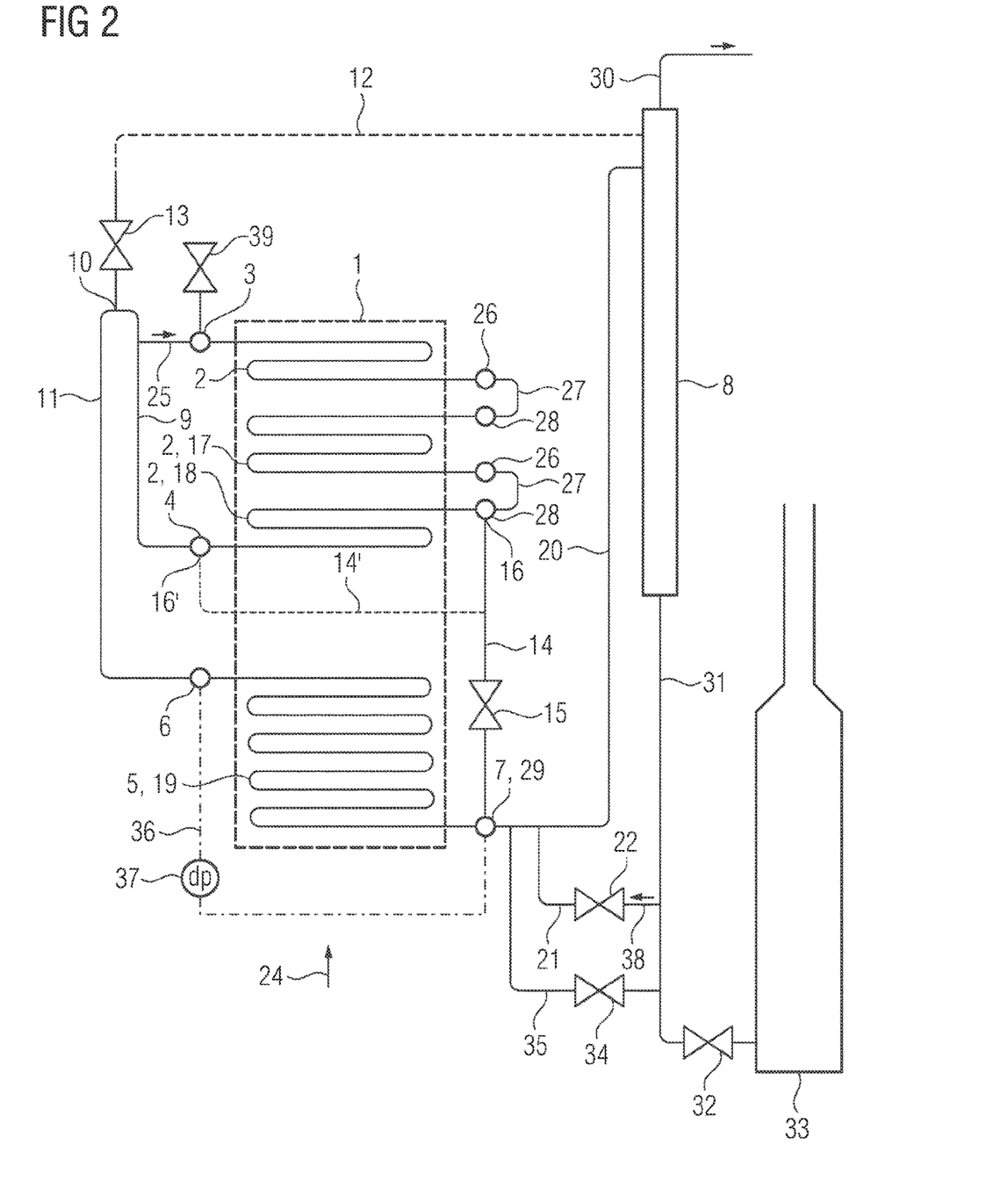
FIG. 2 shows a heat recovery steam generator according to the invention.

A significant improvement can be achieved for warm/hot start-up conditions if, as shown in FIG. 2, between last 18 or second last economizer heating surface 17 and the evaporator outlet 7 at the bottom of evaporator heating surface 5, a first filling line 14, 14' is arranged on the feed water side, designed in such a way that, in preparation for start-up under warm/hot conditions, warm/hot feed water from economizer heating surface 2 can be used to fill up evaporator heating surface 5 from the bottom through first filling lines 14, 14' and first valve 15. To prepare for start-up of the vertical once-though heat recovery steam generator, the evaporator heating surface 5 can thus, also under warm/hot conditions, be partially filled, to such an extent that an optimization between minimum water ejection and optimized start-up time can be achieved.

When the economizer heating surface 2 is filled with warm/hot feed water and if the evaporator heating surface 5 is (partially) filled with steam, opening of first valve 15 will result in warm/hot feed water flowing from economizer filling outlet 16, 16' of the last or second last economizer heating surface 17, 18 through first filling line 14, 14' to the evaporator outlet 7 of a last evaporator heating surface 5, 19. The warm/hot feed water will start flowing because the liquid levels in evaporator heating surface 5 and first filling line 14, 14' are in fluid communication.

Water/steam mixture in evaporator heating surface 5 has a lower density than the warm/hot feed water flowing into first filling line 14, 14' and the liquid levels of first filling line 14, 14' and evaporator heating surface 5 are in fluid communication. Therefore, the water/steam mixture present in evaporator heating surface 5 will be displaced by warm/hot feed water flowing from bottom to top through evaporator heating surface 5.

Warm/hot feed water leaving economizer heating surface 2, 18 at the bottom will be supplemented by cool feed water 25 at the top. Water/steam mixture displaced from evaporator heating surface 5 by warm/hot feed water entering through first filling line 14, 14' escapes through down-pipe 11, via first vent valve 13 and vent conduit 12 to water/steam separator 8.

When evaporator heating surface 5 is completely filled, or when warm/hot filling valve 15 is closed, economizer heating surface 2 can be filled up by feeding cool feed water 25 to the top. Feed water will flow from the economizer outlet 4 to riser 9. Liquid levels in riser 9 and economizer heating surface 2 are in fluid communication. When economizer heating surface 2 is completely filled, feed water will overflow from riser 9 via overflow 10 into down-pipe 11.

Figure 3:
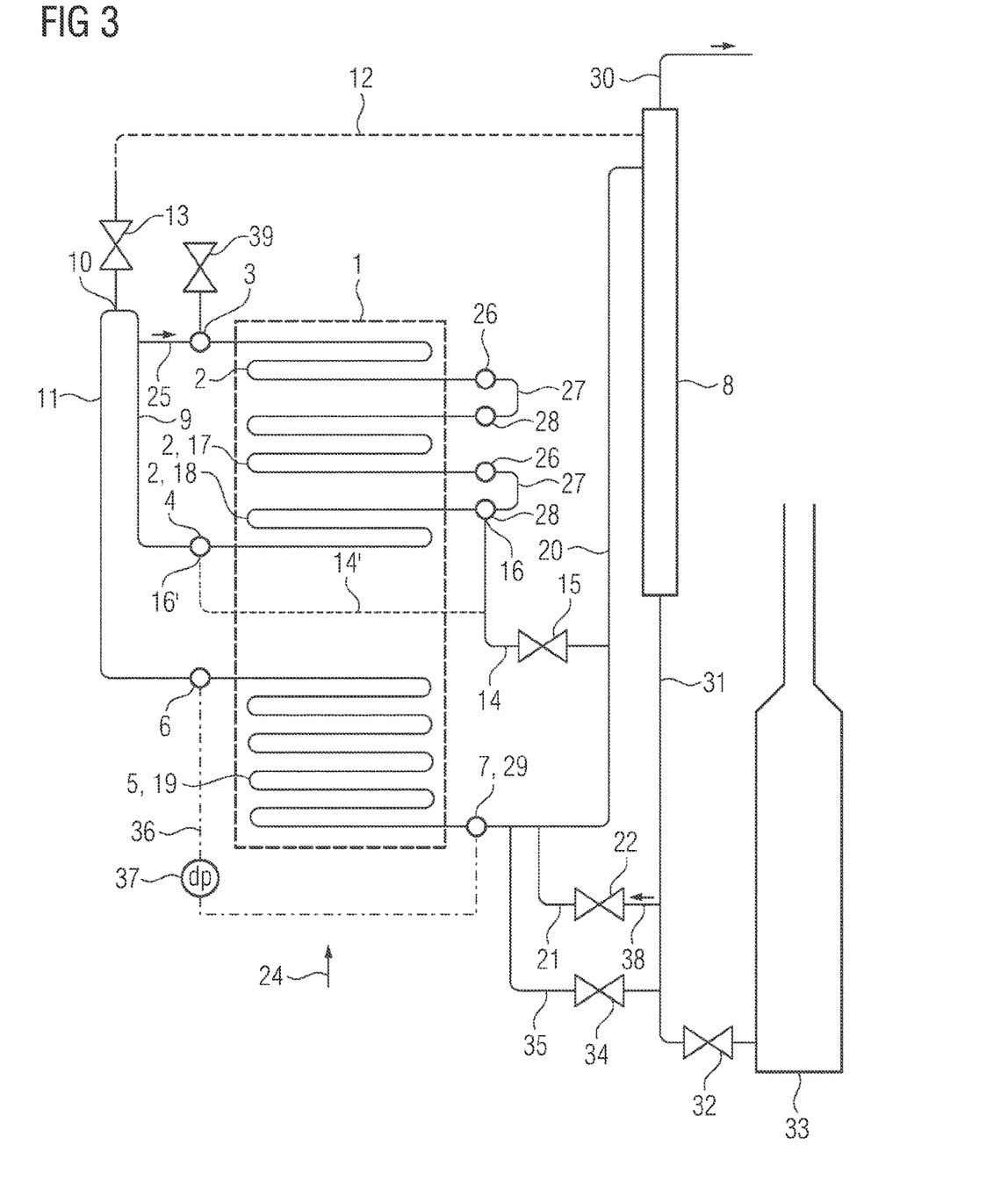
FIG. 3 shows an alternative arrangement of a heat recovery steam generator according to the invention.

In another embodiment, the first filling line 14, 14' is, as shown in FIG. 3, arranged between last or second last economizer heating surface and connecting first connecting line 20. First connecting line 20 and evaporator heating surface 5 are in fluid communication, thus allowing fill up of evaporator heating surface 5 from the bottom though first connecting line 20.

Figure 4:
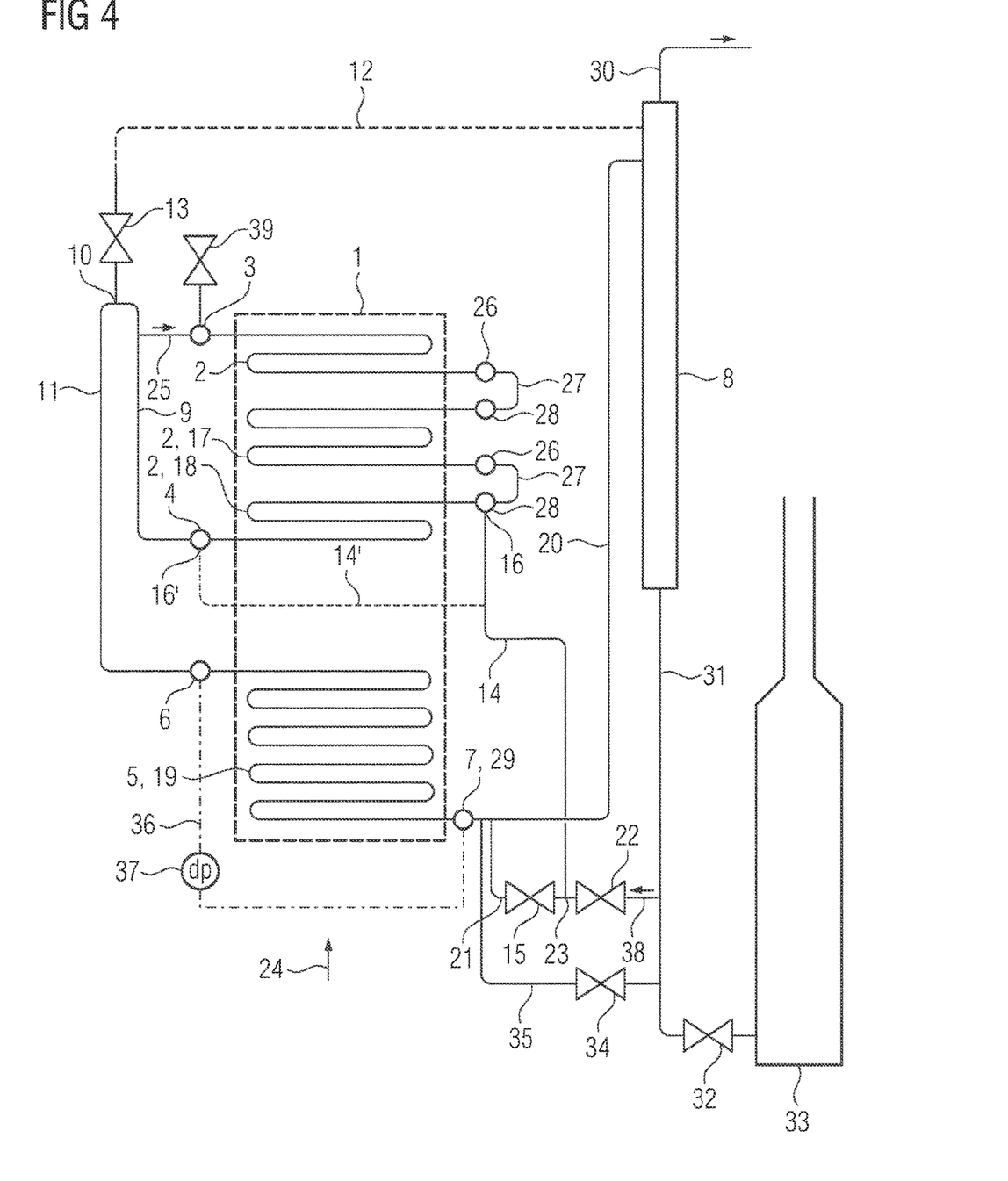
FIG. 4 shows yet another heat recovery steam generator according to the invention.

In yet another embodiment, the first filling line 14, 14' is, as shown in FIG. 4, arranged between last or second last economizer heating surface 17, 18 and second filling line 21 in which the second valve 22 is also arranged. More precisely, the first filling line 14, 14' is connected to the second filling line 21 at a connection point 23 downstream of the second valve 22, and the first valve 15 is arranged downstream of the connection point 23 in the second filling line 21.

In preparation for start-up under warm/hot conditions, with second valve 22 closed, warm/hot feed water from economizer heating surface 2 can be used to fill up evaporator heating surface 5 from the bottom through first filling lines 14, 14', first valve 15 and second filling line 21.

For initial filling of evaporator heating surface 5 under cold conditions, cold water 38 can be admitted through second filling line 21, second valve 22 and first valve 15 to (partially) fill up evaporator heating surface 5 from bottom to top. Filling from bottom to top has the advantage of effectively displacing air from evaporator heating surface 5 by the entering cold feed water 38. Air can escape through down-pipe 11 via first vent valve 13 and vent line 12 to water/steam separator 8.

If first valve 15 is kept closed, initial filling from bottom to top can also be achieved for economizer heating surface 2. Cold water 38 can be admitted through second filling line 21, second valve 22 and first filling line 14, 14' to fill up economizer heating surface 2 from the bottom. Filling from bottom to top has the advantage of effectively displacing air from economizer heating surface 2 by the entering cold feed water. Air can escape through second vent valve 39.

What is claimed is:

1. A heat recovery steam generator of vertical design, comprising:
    an exhaust-gas channel in which at least one economizer heating surface with economizer inlet and economizer outlet and at least one evaporator heating surface with evaporator inlet and evaporator outlet are arranged,
    wherein the at least one economizer heating surface and the at least one evaporator heating surface are connected to one another in such a way that, on a feed water side, the at least one economizer heating surface is arranged upstream of the at least one evaporator heating surface, such that the economizer outlet is in fluid connection with the evaporator inlet,
    wherein a water/steam separator is arranged on the feed water side downstream of the at least one evaporator heating surface,
    wherein an excess pipe length system is arranged outside the exhaust-gas channel and on the feed water side between the at least one economizer heating surface and the at least one evaporator heating surface,
    wherein the excess pipe length system is designed in such a way that, after a complete filling of the at least one economizer heating surface, feed water, in a riser of the excess pipe length system, reaches an overflow and thus passes into the at least one evaporator heating surface via a down pipe,
    wherein a vent line with a vent valve branches off the overflow of the excess pipe length system,
    wherein a first filling line and a first valve are arranged between an economizer filling outlet, arranged downstream of the economizer inlet of the at least one economizer heating surface, and the evaporator outlet of the at least one evaporator heating surface,
    wherein the first filling line leads to the evaporator outlet of a last evaporator heating surface and the first valve is arranged in the first filling line, and
    wherein a connecting line interconnects the evaporator outlet of the last evaporator heating surface and the water/steam separator, and the first filling line leads to the connecting line and the first valve is arranged in the first filling line.

2. The heat recovery steam generator according to claim 1,
    wherein the first valve and at least part of the first filling line are arranged outside the exhaust-gas channel.

3. The heat recovery steam generator according to claim 1,
    wherein the first filling line branches off from, on a feed water side, a second to last economizer heating surface.

4. The heat recovery steam generator according to claim 1,
    wherein the first filling line branches off from, on a feed water side, a last economizer heating surface.

5. The heat recovery steam generator according to claim 1,
    wherein the vent line is arranged between the overflow of the excess pipe length system and the water/steam separator.

6. The heat recovery steam generator, as claimed in claim 1,
    wherein a second filling line is connected to the connecting line and a second valve is arranged in the second filling line.

7. The heat recovery steam generator, as claimed in claim 6,
    wherein the first filling line is connected to the second filling line at a connection point downstream of the second valve, and the first valve is arranged downstream of the connection point in the second filling line.

8. A method for refilling an evaporator heating surface of a heat recovery steam generator of vertical design, the heat recovery steam generator comprising an exhaust-gas channel in which at least one economizer heating surface with economizer inlet and economizer outlet and at least one evaporator heating surface with evaporator inlet and evaporator outlet are arranged, wherein the at least one economizer heating surface and the at least one evaporator heating surface are connected to one another in such a way that, on a feed water side, the at least one economizer heating surface is arranged upstream of the at least one evaporator heating surface, such that the economizer outlet is in fluid connection with the evaporator inlet, wherein a water/steam separator is arranged on the feed water side downstream of the at least one evaporator heating surface, wherein an excess pipe length system is arranged outside the exhaust-gas channel and on the feed water side between the at least one economizer heating surface and the at least one evaporator heating surface, wherein the excess pipe length system is designed in such a way that, after a complete filling of the at least one economizer heating surface, feed water, in a riser of the excess pipe length system, reaches an overflow and thus passes into the at least one evaporator heating surface via a down pipe, wherein a vent line with a vent valve branches off the overflow of the excess pipe length system, wherein a first filling line and a first valve are arranged between an economizer filling outlet, arranged downstream of the economizer inlet of the at least one economizer heating surface, and the evaporator outlet of the at least one evaporator heating surface, wherein the first filling line leads to the evaporator outlet of a last evaporator heating surface and the first valve is arranged in the first filling line, and wherein a connecting line interconnects the evaporator outlet of the last evaporator heating surface and the water/steam separator, and the first filling line leads to the connecting line and the first valve is arranged in the first filling line, the method comprising:

supplying water from the at least one economizer heating surface to the evaporator heating surface from the evaporator outlet.

\* \* \* \* \*